US011390467B2

(12) United States Patent
Torrella Cardus

(10) Patent No.: US 11,390,467 B2
(45) Date of Patent: Jul. 19, 2022

(54) CONTAINER-ORIENTING DEVICE AND POSITIONING MACHINE SUPPORTING SAME

(71) Applicant: TRAKTECH CONTRUCCIONS MECANIQUES, S.L., Terrassa (ES)

(72) Inventor: Joaquim Torrella Cardus, Terrassa (ES)

(73) Assignee: TRAKTECH CONTRUCCIONS MECANIQUES, S.L., Terrassa (ES)

( * ) Notice: Subject to any disclaimer, the term of this patent is extended or adjusted under 35 U.S.C. 154(b) by 0 days.

(21) Appl. No.: 17/041,361

(22) PCT Filed: Apr. 12, 2019

(86) PCT No.: PCT/ES2019/070258
§ 371 (c)(1),
(2) Date: Sep. 24, 2020

(87) PCT Pub. No.: WO2019/211500
PCT Pub. Date: Nov. 7, 2019

(65) Prior Publication Data
US 2021/0053769 A1   Feb. 25, 2021

(30) Foreign Application Priority Data
May 4, 2018   (ES) ................. ES201830442

(51) Int. Cl.
*B65G 47/14* (2006.01)
(52) U.S. Cl.
CPC .. *B65G 47/1457* (2013.01); *B65G 2201/0244* (2013.01)
(58) Field of Classification Search
CPC ................................................. B65G 47/1457
See application file for complete search history.

(56) References Cited

U.S. PATENT DOCUMENTS

| 3,650,368 | A  | * | 3/1972 | Nalbach | B65G 47/1457 |
|           |    |   |        |         | 198/397.05   |
| 6,435,333 | B1 | * | 8/2002 | Sala    | B65G 47/1457 |
|           |    |   |        |         | 198/384      |

(Continued)

FOREIGN PATENT DOCUMENTS

| EP | 1142807 A2 | 10/2001 |
| EP | 1262429 A1 | 12/2002 |

(Continued)

OTHER PUBLICATIONS

PCT Search Report with English translation for International Application No. PCT/ES2019/070258 dated May 24, 2019, 7 pp.

(Continued)

*Primary Examiner* — William R Harp
(74) *Attorney, Agent, or Firm* — The Roy Gross Law Firm, LLC; Roy Gross

(57) ABSTRACT

The invention relates to a container-positioning device and a positioning machine supporting same. The device can be used with containers that have a neck and a mouth. It comprises a funnel (4) whose edges are made up of: A first curved, stationary plate (5), the center of which is oriented towards the inside of the funnel (4). A second plate (6), opposite the former and movable in the horizontal direction, and which has an upper section (61), with a retractable orienting device (11). The upper section (61) is movable relative to a lower section (62), between: a first end at which it is aligned with the lower section (62) or closer to the first plate (5) than the lower section (62); and a second end at which the upper section (61) is farther from the first plate (5); a third flat plate (9) movable in a direction perpendicular to the opening (1).

7 Claims, 3 Drawing Sheets

(56) References Cited

U.S. PATENT DOCUMENTS

| | | | | |
|---|---|---|---|---|
| 6,966,422 | B2* | 11/2005 | Lanfranchi | B65G 47/1457 198/396 |
| 6,991,085 | B2* | 1/2006 | Lanfranchi | B65G 47/1457 198/396 |
| 8,096,403 | B2* | 1/2012 | Marti Sala | B65G 47/256 198/384 |
| 2006/0104761 | A1* | 5/2006 | Lanfranchi | B67C 9/00 414/405 |
| 2019/0071256 | A1* | 3/2019 | Lanfranchi | B65G 47/256 |

FOREIGN PATENT DOCUMENTS

| | | | |
|---|---|---|---|
| ES | 2250013 | A1 | 4/2006 |
| ES | 2271620 | T3 | 4/2007 |
| WO | 2017137575 | A1 | 8/2017 |

OTHER PUBLICATIONS

PCT Written Opinion with English translation for International Application No. PCT/ES2019/070258 dated May 24, 2019, 8 pp.

PCT Preliminary Report on Patentability with English translation for International Application No. PCT/ES2019/070258 dated Nov. 10, 2020, 10 pp.

\* cited by examiner

CONTAINER-ORIENTING DEVICE AND POSITIONING MACHINE SUPPORTING SAME

CROSS REFERENCE TO RELATED APPLICATIONS

This application is a National Phase of PCT Patent Application No. PCT/ES2019/070258 having International filing date of Apr. 12, 2019, which claims priority of Spanish Patent Application No. ES P201830442 filed on May 4, 2018. The contents of the above applications are all incorporated by reference as if fully set forth herein in their entirety.

TECHNICAL FIELD

The present invention relates to a container-orienting device applicable to a bottle-positioning device, or a positioning device for other similar, rotating containers with a change in format based on the adjustment of the parts thereof. It also relates to the rotating positioning machine supporting same.

It can be applied in the field of producing and filling containers, as well as other similar industries.

PRIOR ART

Sometimes, during the manufacture of containers, before they are filled or in other similar operations, the bottles or containers need to be oriented in order to place them in the correct position, with the mouth oriented upwards. These containers come from a bin where they are randomly placed, and therefore the orienting device must allow for such variability in the initial orientation.

Rotating positioning devices start out from a chamber from where the containers fall onto a rotating plate, which chamber contains on its periphery a series of openings for discharging the containers. Orienting devices made up of upper receptacles and lower funnels are arranged in those openings. Only containers lying in the transverse position can pass through the openings, so the first part of the orientation is already achieved. However, the mouth of the container may be positioned in one direction or in the opposite direction, and it must be caused to rotate in the correct direction.

A first solution can be found in patent ES2210750T3, with the detailed description of an embodiment thereof being incorporated herein by reference. This patent incorporates elements for adjusting the upper receptacles and funnels, divided into several movable parts connected to one another, such that all the adjustments for each receptacle and funnel are integral and applied to all the orienting devices in parallel.

However, this solution simplifies transitioning to different container dimensions at the cost of generating a series of drawbacks.

First, it does not allow the different elements to be adjusted individually, so it does not take into consideration that many containers behave differently in the upper receptacle and in the funnel. Therefore, the adjustments need to be able to be customized.

Moreover, since all the elements are communicated with one another, replacement in the event of a malfunction or for any other reason is made unnecessarily complicated.

Finally, the need for the elements to be communicated with one another increases the complexity and the number of parts, whereby increasing the size of the equipment and reducing reliability.

The applicant does not know of other devices or orienting devices similar to the invention.

DISCLOSURE OF THE INVENTION

According to the claims, the invention consists of a container-orienting device the embodiments of which solve the problems of the state of the art. It likewise relates to the positioning machine incorporating same.

In the specification, "approximately vertical" shall be regarded as covering both the purely vertical angle and any similar angle which allows a container sliding into contact with that element to fall on its base and remain upright. The maximum angle will depend in part on the dimensions and weights of the type of containers used, so as a general rule an angle of not more than 20° will be preferred.

The container-positioning device of the invention is intended for containers of the type having a neck and a mouth in said neck. The device, in turn, is of the type having an inlet opening into an upper receptacle (where only the vessel that is "lying down" may enter and a funnel arranged below the upper receptacle. The funnel has a tapering adjustable section, such as the one mentioned in the state of the art. However, unlike the known funnels, the funnel has edges made up of:

A first curved, stationary plate, arranged on a smaller side of the opening (i.e., radial to the rotating plane of the machine once it is placed). Its center is oriented towards the inside of the funnel, and its lower area is approximately vertical, as it is the point where the container ends up falling.

A second plate, opposite the first plate and movable in the horizontal direction. Therefore, it can move farther away from or closer to the first plate. The second plate has an upper section which is movable relative to an approximately vertical lower section. There may be an articulation between the two, or a flexible section can be arranged between both for a smooth transition. The movement of the upper section has a first end at which it is aligned with the lower section, or closer to the first plate, and a second end at which the upper section is tilted and farther from the first plate than the lower section. The upper section may take any position between both ends. Both movements of the plate allow the funnel to adapt to different container lengths.

A third approximately vertical, flat plate parallel to the larger side of the inlet opening into the upper receptacle and movable in a direction perpendicular thereto. For the sake of simplicity, the third plate will normally be right below the opening, but it may be on the opposite side.

A fourth stationary edge, opposite the third plate.

The upper section of the second plate has an orienting device generally articulated to same, with a first position in which it protrudes towards the first plate (perpendicular or at an angle) and a second position in which it is integrated in the upper section. This orienting device is prepared for intercepting the neck of the bottle and causing it to turn over.

In a preferred embodiment, the orienting device is arranged below the upper receptacle, such that it cannot block access to the upper receptacle.

The movable parts (plates and upper section) preferably have electromechanical actuators, which are more preferably controlled by a controller.

In turn, the upper receptacle may also have a movable edge, moved by an actuator, in a direction parallel to the third plate.

The invention also relates to a container-positioning machine. As indicated, it is of the type comprising a rotating plane, under a bulk container-feeding device or chamber, in a random initial position. This rotating plane has at least one perimetral opening where a container-orienting device is arranged. According to the invention, this container-orienting device is of the type indicated above.

If the machine has several container-orienting devices, their plates (including the upper section and the orienting device, which are part of the second plate) can be adjusted independently of one another.

An important advantage of the invention is that the funnels are individual and identical, as they are independent of one another. Therefore, each one can be replaced individually without requiring a large stock of parts. The biggest advantage is that the funnel will always be of the same model, regardless of the size of the machine. With the system of the earlier patent, the integral adjustment mechanism makes it necessary to design funnels specific to each machine.

Furthermore, the simplicity of adjusting the plates allows smaller positioning machines to be obtained, so they can be applicable in environments with many references or little production.

Other variants will be described below.

DESCRIPTION OF THE DRAWINGS

To better understand the invention, the following figures are included.

EMBODIMENTS OF THE INVENTION

An embodiment of the invention is very briefly described below as an illustrative, non-limiting example thereof.

Figure 1:
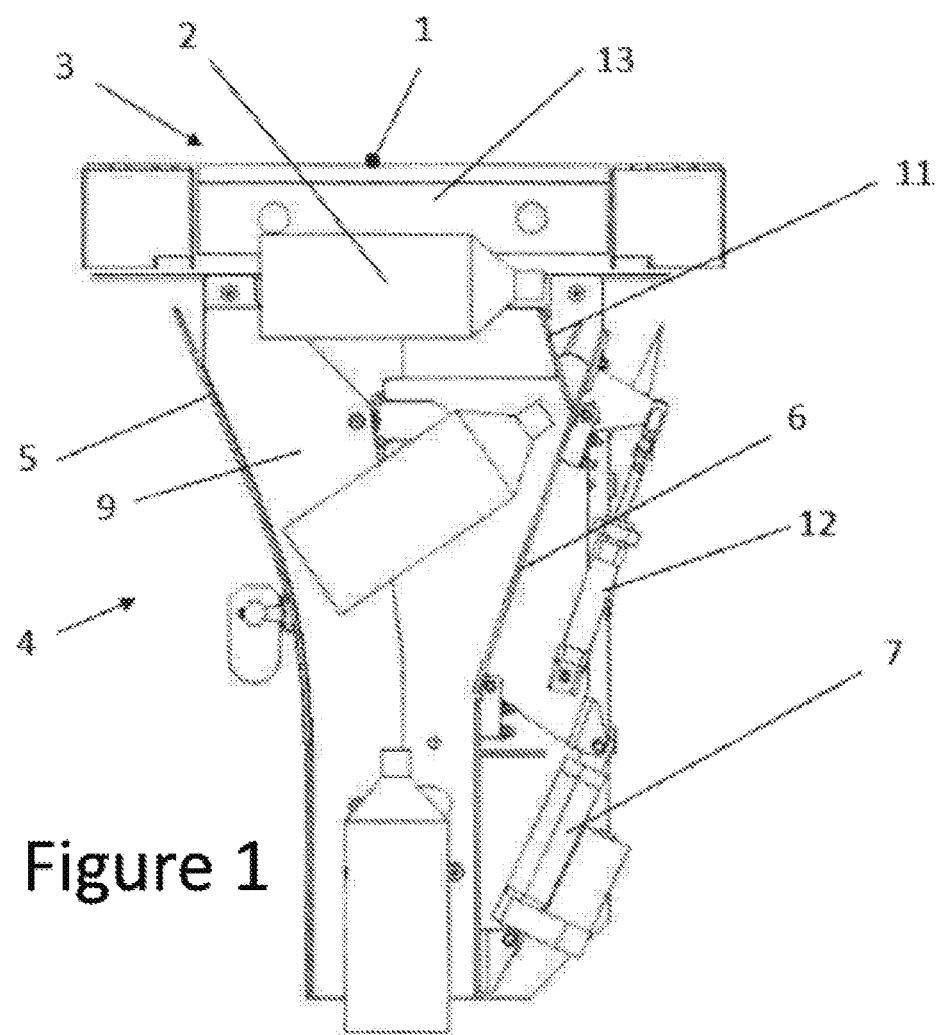
FIG. 1 shows a front view of an embodiment of the device.
Figure 2:
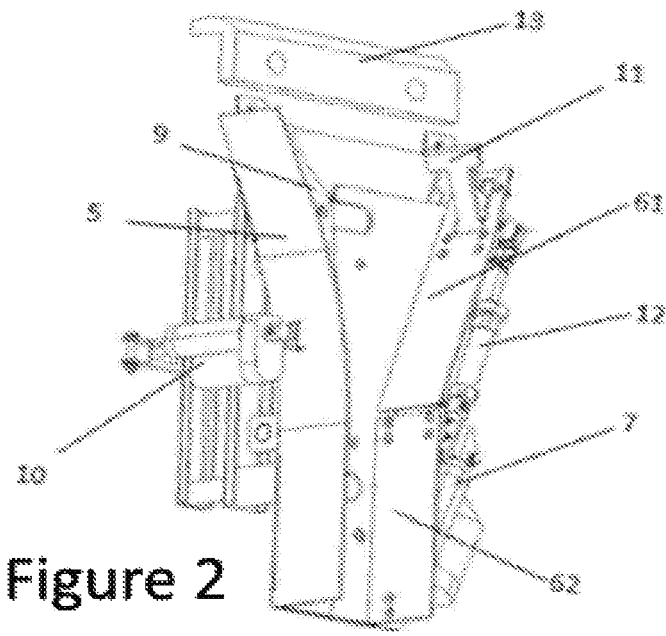
FIG. 2 shows a perspective view of the preceding example of application.
Figure 3:
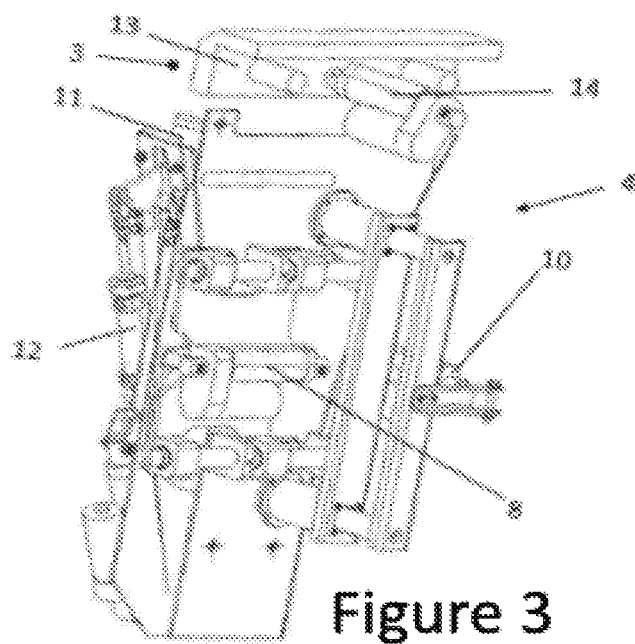
FIG. 3 shows a rear view of the example of FIG. 1
Figure 4:
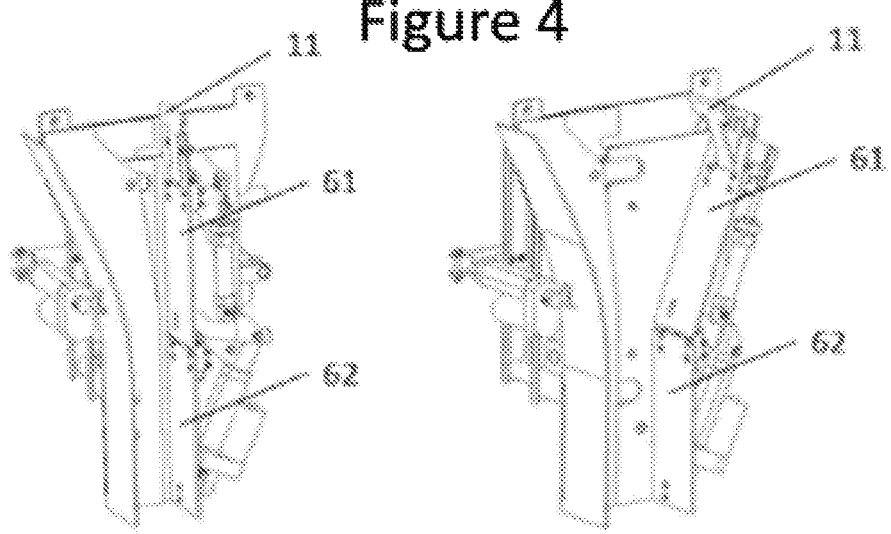
FIG. 4 shows a perspective view of the funnel with the upper section of the second plate in two end position examples.
Figure 5:
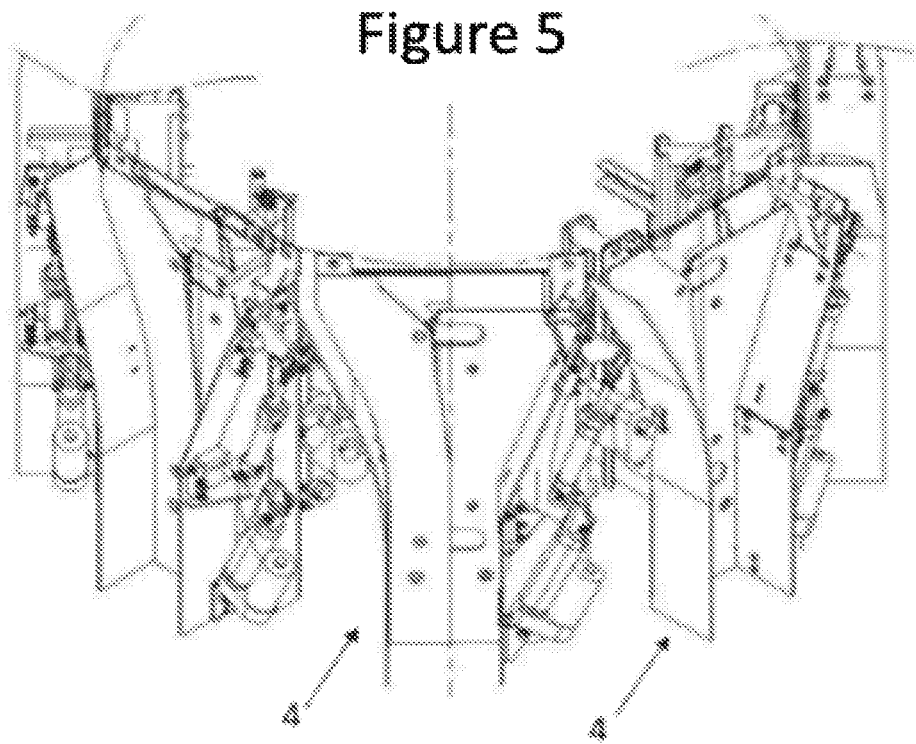
FIG. 5 shows a diagram of the position of the devices of the invention, according to the embodiment, in a positioning machine.

The positioning device shown in FIGS. 1 to 5 comprises a through opening (1) where containers (2) enter an upper receptacle (3), and a funnel (4) arranged below the upper receptacle (3). The section of the funnel (4) and of the upper receptacle (3) will usually be rectangular or square, and the dimensions thereof can be adjusted. In any case, a "larger side" will be defined as the side which may be longer, and a "smaller side" defined as one perpendicular to the former.

The upper receptacle (3) generally has a parallelepipedic shape, whereas the funnel (4) has at least two edges converging towards the lower part.

The funnel (4) has a series of plates defining its section. A first curved plate (5) is stationary and defines a minimal narrowing for the funnel (4). The center of the first plate (5) is oriented towards the inside of the funnel (4), whereas the lower area is approximately vertical. On the opposite side there is arranged a second plate (6), which is movable by an opening actuator (7), which varies the maximum opening of the funnel (4), tilting an upper section (61) of the second plate (6), such that the second plate (6) may be in a straight or even concave position (FIG. 4, left side), where the narrowing corresponds to that marked by the first plate (5), and a tilted position in which the second plate (6) is in a convex position (FIG. 4, right side), with the upper section (61) farther from the first plate (5) than a lower section (62).

A width actuator (8) varies the separation between the first plate (5) and the second plate (6) so as to be adapted to the width of the container. By adjusting the actuators of the second plate (6), the height to width ratio of the container to be positioned may be varied. Moreover, the mouth and the lower part of the funnel (4) are independent and can be individually adjusted as a result of the second plate (6) being separated in two sections.

A third edge of the funnel (4) is defined by a third, usually vertical and flat plate (9), which is movable by a depth actuator (10) which, like the width actuator (8), will be associated with the section of the container. This third plate will be parallel to the opening (1), usually below same, although it may be on the edge facing the opening (1).

The fourth edge of the funnel (4) will also be stationary and has been eliminated in the figures to enable seeing the rest of the device. In any case it will be substantially parallel to the third plate (9) so as not to modify the through section of the funnel (4).

Lastly, a retractable orienting device (11) is arranged in the upper section (61) and moved by an orientation actuator (12) which causes the orienting device (11) to protrude towards the inside of the funnel (4) or to retract into the second plate (6). The orienting device (11) will be in the funnel (4), below the upper receptacle (3) where the containers enter after passing the opening (1). That is, it will be located below the rotating plane of the rotating positioning machine. The risk of jamming in the device is thereby reduced, since the container has a clear entry at all times. The device will have its own sensor (not depicted) or a connection to an external sensor in order to know if the vessel has entered the upper receptacle (3) in one direction or the other. These sensors can be optical, physical (the position of a flexible rod, etc.) and will not be described as they are known in the state of the art.

If the container falls with the mouth directed towards the second plate (6) (FIG. 1), the orienting device (11) will protrude to stop the mouth of the container and cause the container to turn over. Otherwise, it will be the curvature of the first plate (5) which causes it to turn over in the opposite direction.

In turn, the upper receptacle (3) may also have a movable edge (13), moved by an actuator of the receptacle (14), in a direction parallel to the third plate (9) to adjust the width of the vessel. The length of the upper receptacle (3) can also be adjusted, although it may be sufficient to simply place a passage-reducing element instead of a movable element.

The actuators (7, 8, 10, 12, 14) may be pneumatic, hydraulic, electromechanical, etc., although electromechanical actuators are preferred to make it easier to replace them in case of malfunction. They will preferably be controlled by a controller (not shown) to make it easier to adjust the dimensions.

The positioning machine will usually comprise several similar devices on the periphery of the rotating plane for discharging containers. Each of these devices will be independent, although the controller (not depicted) may be common to all of them.

The invention claimed is:

1. A container-positioning device of the type having a neck and a mouth, having an inlet opening (1) into an upper receptacle (3) and a funnel (4), arranged below the upper receptacle (3), having a tapering adjustable section, wherein the funnel (4) has edges made up of:
- a first curved, stationary plate (5), arranged on a smaller side of the opening (1), the center of which is oriented towards the inside of the funnel (4), and the lower area of which is approximately vertical;
- a second plate (6), opposite the first plate (5) and movable in the horizontal direction, and which has an upper section (61) that is movable relative to an approximately vertical lower section (62) of the second plate (6), between:
  - a first end aligned with the lower section (62) or closer to the first plate (5) than the lower section (62); and
  - a second end at which the upper section (61) is tilted and farther from the first plate (5) than the lower section (62);
- a third approximately vertical, flat plate (9), parallel to a larger side of the opening (1), movable in a direction perpendicular to the opening (1);
- a fourth stationary plate, opposite the third plate (9); and wherein the upper section (61) of the second plate (6) has an oscillating element (11) with a first position in which the oscillating element (11) protrudes towards the first plate (5) and a second position in which the oscillating element (11) is integrated in the upper section (61).

2. The container-positioning device of claim 1, the oscillating element (11) of which is arranged below the upper receptacle (3).

3. The container-positioning device of claim 1, the movable parts of which have electromechanical actuators (7, 8, 10, 12).

4. The container-positioning device of claim 3, the actuators (7, 8, 10, 12) of which are controlled by a controller.

5. The container-positioning device of claim 1, the upper receptacle (3) of which has a movable edge (13), moved by an actuator of the receptacle (14), in a direction parallel to the third plate (9).

6. A container-positioning machine, comprising a rotating plane, under a bulk container-feeding device or chamber, with at least one perimetral opening (1) where the container-positioning device of claim 1 is arranged.

7. The container-positioning machine of claim 6, having two or more container-positioning devices, wherein the plates (5, 6, 9) of each funnel (4) can be adjusted independently of the plates (5, 6, 9) of the other funnels (4).

* * * * *